United States Patent [19]
Yamamoto et al.

[11] Patent Number: 5,322,881
[45] Date of Patent: Jun. 21, 1994

[54] THERMOPLASTIC RESIN COMPOSITIONS

[75] Inventors: Naoki Yamamoto; Akira Nakata; Atsunori Koshirai, all of Otake, Japan

[73] Assignee: Mitsubishi Rayon Co., Ltd., Tokyo, Japan

[21] Appl. No.: 930,708

[22] PCT Filed: Feb. 5, 1992

[86] PCT No.: PCTJP92/001123

§ 371 Date: Sep. 30, 1992

§ 102(e) Date: Sep. 30, 1992

[87] PCT Pub. No.: WO92/13918

PCT Pub. Date: Aug. 20, 1992

[30] Foreign Application Priority Data

Feb. 5, 1991 [JP] Japan .................................. 3-014429
Feb. 6, 1991 [JP] Japan .................................. 3-015524
Feb. 7, 1991 [JP] Japan .................................. 3-016683

[51] Int. Cl.$^5$ ............................................ C08L 51/08
[52] U.S. Cl. ............................ 524/504; 524/506; 524/588; 524/602
[58] Field of Search ............... 525/63, 431, 479, 903; 524/506, 504, 588, 602

[56] References Cited

U.S. PATENT DOCUMENTS 4,902,742  2/1990  Yamamoto et al. ............... 525/63
5,011,887  4/1991  Sasaki et al. ..................... 525/63
5,147,947  9/1992  Yamamoto et al. ............... 525/479

FOREIGN PATENT DOCUMENTS 308198      3/1989   European Pat. Off. .
61-235462  10/1986   Japan .
1-261486   10/1989   Japan .
2-1763      1/1990   Japan .
2-18444     1/1990   Japan .
2-138360    5/1990   Japan .
245050      9/1990   Japan .
2-305860   12/1990   Japan .
86/03214    6/1986   PCT Int'l Appl. .

*Primary Examiner*—Ralph H. Dean
*Attorney, Agent, or Firm*—Cushman, Darby & Cushman

[57] ABSTRACT

A thermoplastic resin composition comprising at least one thermoplastic resin selected from the group consisting of polyamide resins, polymethacrylimide resins and polyetherimide resins, a polyorganosiloxane graft copolymer obtained by graft-polymerizing one or more kinds of vinyl monomer onto a polyorganosiloxane rubber or a polyorganosiloxane compound rubber having such a structure that the polyorganosiloxane rubber component and polyalkyl (meth)acrylate rubber component are not separable from each other, and an organic silane compound having an epoxy group. The present invention provides a thermoplastic resin composition which is excellent in impact resistance, heat resistance, surface appearance and the like, and can be used under severer conditions than before.

7 Claims, No Drawings

THERMOPLASTIC RESIN COMPOSITIONS

TECHNICAL FIELD

The present invention relates to a thermoplastic resin composition in which a thermoplastic resin such as a polyamide resin, polymethacrylimide resin and polyetherimide resin (hereinafter referred to as polyamide resin and the like) has been improved in impact resistance while maintaining its mechanical properties such as strength, stiffness and the like.

BACKGROUND ART

Hitherto, there have been proposed many methods for improving the impact resistance of thermoplastic resins such as polyamide resin and the like. For example, a method of blending a thermoplastic resin and a polyorganosiloxane graft copolymer, which is described in Japanese Patent Application Kokai No. 61-235462 and No. 2-1763, is a relatively good method. In this method, however, dispersion of the polyorganosiloxane graft copolymer depends upon interaction between the polymer constituting the outermost layer of the graft copolymer and the matrix resin, so that there is a case wherein an improvement in impact strength is insufficient depending upon properties of the matrix resin. Consequently, resin compositions developing a higher impact resistance are being demanded.

In view of the situation as mentioned above, the present inventors have extensively, studied to improve the impact resistance of polyamide resins, polymethacrylimide resins and polyetherimide resins over a wider temperature range. As a result, the present inventors have found that thermoplastic resin compositions having improved impact resistance over a wider temperature range and also being superior in heat resistance, appearance of molded product and adhesion property of paint film are obtained by blending these thermoplastic resins with a polyorganosiloxane graft copolymer obtained by graft-polymerizing one or more kinds of vinyl monomer onto a polyorganosiloxane rubber or a polyorganosiloxane compound rubber having such a structure that the polyorganosiloxane rubber component and polyalkyl (meth)acrylate rubber component cannot be separated from each other, and an organic silane compound having an epoxy group. The present inventors thus attained to the present invention.

DISCLOSURE OF INVENTION

The gist of the present invention is a thermoplastic resin composition comprising (A) 60 to 99 parts by weight of at least one thermoplastic resin selected from the group consisting of polyamide resins, polymethacrylimide resins and polyetherimide resins, (B) 1 to 40 parts by weight of a polyorganosiloxane graft copolymer obtained by graft-polymerizing one or more kinds of vinyl monomer onto a polyorganosiloxane rubber or a polyorganosiloxane compound rubber having such a structure that the polyorganosiloxane rubber component and polyalkyl (meth)acrylate rubber component cannot be separated from each other, the total amount of both the components (A) and (B) being 100 parts by weight, and (C) 0.01 to 10 parts by weight of an organic silane compound having an epoxy group, and if necessary, a filler (D) in an amount of 10 to 300 wt.% based on the total amount of (A), (B) and (C).

BEST MODE FOR CARRYING OUT THE INVENTION

The polyamide resin used in the present invention includes polyamides obtained from an aliphatic, aromatic or alicyclic dicarboxylic acid and a diamine, and polyamides obtained from aminocarboxylic acids or cyclic lactams. Preferred specific examples include nylon 6, nylon 12, nylon 6·6, nylon 4·6, nylon MXD 6, nylon 6/10 copolymer, nylon 6/66 copolymer and the like. Particularly, nylon 6 and nylon 66 are preferably used.

The polymethacrylimide resin preferably used in the present invention includes those containing 5 wt.% or more of a cyclic structure unit represented by the formula (1),

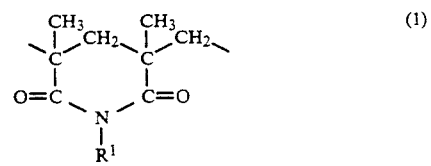

wherein $R^1$ represents a hydrogen atom, a $C_1$–$C_{20}$ alkyl group, a $C_6$–$C_{20}$ cycloalkyl, aryl, allyl or alkenyl group, or a $C_7$–$C_{20}$ aralkyl group. Any polymer will do if it contains the above cyclic structure unit. Generally, however, those in which $R^1$ is a hydrogen atom or a methyl, ethyl, propyl, butyl, phenyl or cyclohexyl group are used.

There is no particular limitation to a method for producing the polymethacrylimide resin, but a method of reacting a methacrylate resin with ammonia or a primary amine at a temperature of 150° to 350° C. in an inert solvent is useful. Those which are useful as the primary amine include methylamine, ethylamine, propylamine, butylamine, aniline and cyclohexylamine. Those which are preferred as the inert solvent include a solvent comprising one or more members selected from the group consisting of aromatic hydrocarbons (e.g. benzene, toluene, xylene) and aliphatic alcohols (e.g. methanol, ethanol, propanol).

It is preferred for the polymethacrylimide resin to contain the cyclic structure unit represented by the formula (1) in an amount of 5 wt.% or more, preferably 20 wt.% or more. When the content of the cyclic structure unit is small, it is difficult to obtain resin compositions having a high heat distortion temperature. The methacrylate resin used to form the polymethacrylimide resin includes for example homopolymers of methacrylates and copolymers of the methacrylates with other methacrylates, acrylates, acrylic acid, methacrylic acid, styrene, substituted styrenes (e.g. α-methylstyrene) and the like.

The methacrylate includes methyl methacrylate, ethyl methacrylate, propyl methacrylate, n-butyl methacrylate, isobutyl methacrylate, tert-butyl methacrylate, cyclohexyl methacrylate, norbornyl methacrylate, 2-ethylhexyl methacrylate, benzyl methacrylate and the like. The acrylate includes methyl acrylate, ethyl acrylate, propyl acrylate, n-butyl acrylate, isobutyl acrylate, tert-butyl acrylate, cyclohexyl acrylate, norbornyl acrylate, 2-ethylhexyl acrylate, benzyl acrylate and the like. These monomers may be used alone or in mixture of two or more of them.

In the present invention, those which are preferred among these methacrylate resins are a methyl methacrylate homopolymer and copolymers of 25 wt.% or more of methyl methacrylate with 75 wt.% or less of the above other monomers. However, the methyl methacrylate homopolymer is most preferred in terms of transparency.

The thermoplastic polyetherimide resin used in the present invention refers to a polymer represented by the formula (2),

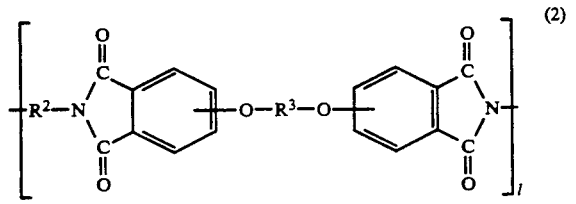
(2)

In the above formula, $R^2$ and $R^3$ independently represent a divalent organic residue, and their specific examples include the following:

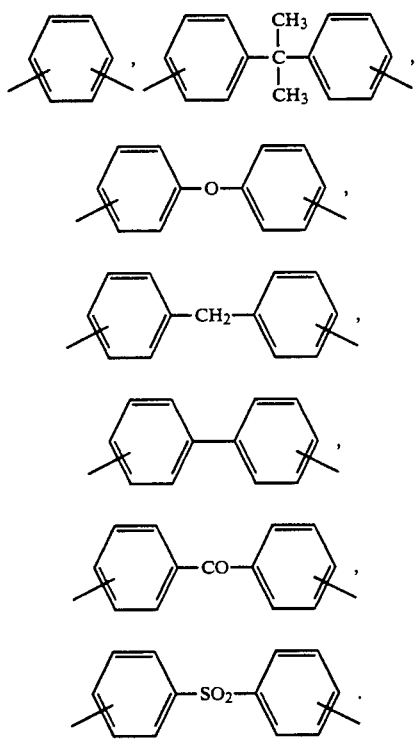

Among these, a polyetherimide resin represented by the following structural formula is preferably used:

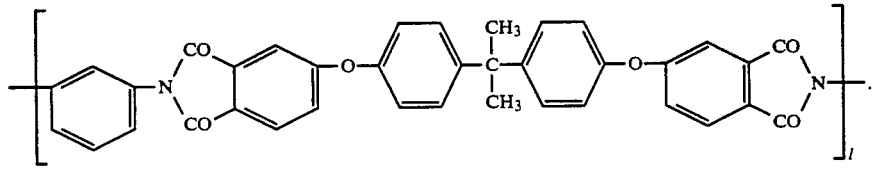

The polyorganosiloxane graft copolymer (B) used in the present invention refers to those obtained by graft-polymerizing one or more kinds of vinyl monomer onto a polyorganosiloxane rubber or a polyorganosiloxane compound rubber having such a structure that the polyorganosiloxane rubber component and polyalkyl (meth)acrylate rubber component cannot be separated from each other. The polyorganosiloxane rubber used here is obtained in the form of fine particle by polymerizing organosiloxane, a crosslinking agent for the polyorganosiloxane rubber [hereinafter referred to as crosslinking agent (I)] and a graft-linking agent for the polyorganosiloxane rubber [hereinafter referred to as graft-linking agent (I)].

The organosiloxane includes three or more-membered cyclic organosiloxanes, among which three to six-membered ones are preferably used. Specific examples of the preferred cyclic organosiloxanes include hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane and the like. These cyclic organosiloxanes are used alone or in mixture of two or more of them. The amount of the cyclic organosiloxane used is preferably 60 wt.% or more, more preferably 70 wt.% or more of the polyorganosiloxane rubber.

The crosslinking agent (I) used is trifunctional or tetrafunctional silane crosslinking agents, i.e. silane compounds having three or four alkoxy groups. Specific examples of the silane compound include trimethoxymethylsilane, triethoxyphenylsilane, tetramethoxysilane, tetraethoxysilane, tetrapropoxysilane, tetrabutoxysilane and the like. Tetrafunctional silane compounds are preferred as the crosslinking agent (I), and among the tetrafunctional crosslinking agents, tetraethoxysilane is particularly preferred. The amount of the crosslinking agent (I) used is preferably 0.1 to 30 wt.%, more preferably 0.5 to 10 wt.% of the polyorganosiloxane rubber. When the amount of the crosslinking agent (I) is less than 0.1 wt.%, molded products obtained from the resin composition become poor in impact strength, and also their appearance tends to become poor. If the agent (I) is used in an amount exceeding 30 wt.%, it does not contribute to further formation of the crosslinked structure.

The graft-linking agent (I) refers to a silane compound having both an alkoxysilane portion and a functional group which function as follows: The former participates in the polymerization to be incorporated into the polyorganosiloxane rubber, and the latter does not react at that time, but reacts at the subsequent steps, i.e. at the step of graft polymerization or the step of preparation of the polyalkyl (meth)acrylate rubber which is carried out in the presence of the polyorganosiloxane rubber in order to prepare the compound rubber. Specific examples of the silane compound used include compounds which form a unit represented by either one of the following formulae:

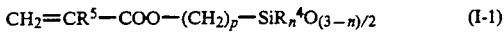
(I-1)

-continued
$$CH_2=CH-SiR^4_nO_{(3-n)/2} \quad (I\text{-}2)$$

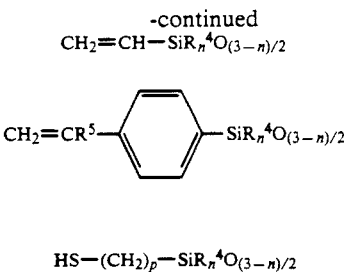
(I-3)

or $$HS-(CH_2)_p-SiR^4_nO_{(3-n)/2} \quad (I\text{-}4)$$

wherein $R^4$ represents a methyl, ethyl, propyl or phenyl group, $R^5$ represents a hydrogen atom or a methyl group, n represents an integer of 0, 1 or 2, and p represents an integer of 1 to 6.

Among these, (meth)acryloyloxyalkoxysilane which can form the unit represented by the formula (I-1), because of its high grafting efficiency, can form effective graft chains, so that it is advantageous in terms of development of impact resistance. As those which can form the unit represented by the formula (I-1), methacryloyloxyalkoxysilane is particularly preferred.

As those which can form the unit of the formula (I-2), vinyltrimethoxysilane, vinylmethyldimethoxysilane and the like can be given. As those which can form the unit of the formula (I-3), 4-vinylphenyldimethoxymethylsilane, 4-vinylphenyltrimethoxysilane and the like can be given. As those which can form the unit of the formula (I-4), γ-mercaptopropyldimethoxymethylsilane, γ-mercaptopropyltrimethoxysilane, γ-mercaptopropyldiethoxyethylsilane, and the like can be given.

Specific examples of methacryloyloxyalkoxysilane include β-methacryloyloxyethyldimethoxymethylsilane, γ-methacryloyloxypropylmethoxydimethylsilane, γ-methacryloyloxypropyldimethoxymethylsilane, γ-methacryloyloxypropyltrimethoxysilane, γ-methacryloyloxypropyldiethoxymethylsilane, γ-methacryloyloxypropylethoxydiethylsilane, δ-methacryloyloxybutyldiethoxymethylsilane and the like. Of these, γ-methacryloyloxypropyldimethoxymethylsilane and γ-methacryloyloxypropyltrimethoxysilane can be given as more preferred ones. The amount of the graft-linking agent (I) used is 0.1 to 10 wt.%, preferably 0.1 to 5 wt.% of the polyorganosiloxane rubber.

The polyorganosiloxane rubber can be obtained in the form of latex by the method, for example, described in U.S. Pat. No. 2,891,920, U.S. Pat. No. 3,294,725, etc. In the present invention, it is preferred for example to produce the polyorganosiloxane rubber by the method in which a mixed solution of organosiloxane, the crosslinking agent (I) and the graft-linking agent (I) is shear-mixed with water with, for example, a homogenizer in the presence of a sulfonic acid emulsifier such as an alkylbenzenesulfonic acid, an alkylsulfonic acid and the like.

The alkylbenzenesulfonic acid is preferred because it acts as an emulsifier for organosiloxane and at the same time acts as a polymerization initiator. In this case, it is preferred to use a metal salt of an alkylbenzenesulfonic acid or alkylsulfonic acid together with the alkylbenzenesulfonic acid because the metal salt has an effect to keep the polymer stable during the graft polymerization.

The polymerization can be stopped by neutralizing the latex with the aqueous solution of an alkali (e.g. sodium hydroxide, potassium hydroxide, sodium carbonate).

In the present invention, when the polyorganosiloxane compound rubber is used as the component (B), this compound rubber can be synthesized as follows: Alkyl (meth)acrylate, a crosslinking agent for the polyalkyl (meth)acrylate rubber [hereinafter referred to as crosslinking agent (II)] and a graft-linking agent for the polyalkyl (meth)acrylate rubber [hereinafter referred to as graft-linking agent (II)] are added to the polyorganosiloxane rubber latex obtained above, or to a polyorganosiloxane latex obtained in the same manner as above except that the cyclic organosiloxane is used in place of the graft-linking agent (I) in an amount equal to that of the agent (I), to impregnate the polyorganosiloxane rubber particles with these components and then these components are polymerized.

When the polyorganosiloxane rubber alone is used as the component (B) and graft polymerization onto it is carried out, the graft polymerization becomes difficult if the graft-linking agent (I) is not contained. While, when the compound rubber is used as the component (B) and graft polymerization onto it is carried out, the polymerization proceeds in a state wherein the polyorganosiloxane rubber particles have been impregnated with the monomers for the polyalkyl (meth)acrylate rubber component. As a result, the polyorganosiloxane rubber and polyalkyl (meth)acrylate rubber form a structure in which their respective crosslinked networks are inseparable from each other. More preferably, the crosslinkage of the polyalkyl (meth)acrylate rubber is formed in a state wherein the above crosslinked networks have been entangled with each other, and thus a structure is formed in which both the rubber components are inseparable from each other. Consequently, if there is no graft-linking agent (I) which is one of the constituents of the polyorganosiloxane rubber, graft polymerization to form the compound rubber becomes possible because the graft-linking agent (II) is contained in the polyalkyl (meth)acrylate rubber component.

The alkyl (meth)acrylate used to prepare the compound rubber includes the acrylate of a straight-chain or branched-chain alkyl group having 1 to 8 carbon atoms and the methacrylate of an alkyl group having 6 to 12 carbon atoms. Specific examples of them include methyl acrylate, ethyl acrylate, n-propyl acrylate, isopropyl acrylate, n-butyl acrylate, isobutyl acrylate, sec-butyl acrylate, 2-methylbutyl acrylate, 3-methylbutyl acrylate, 3-pentyl acrylate, hexyl acrylate, n-heptyl acrylate, 2-heptyl acrylate, n-octyl acrylate, 2-octyl acrylate, 2-ethylhexyl acrylate, hexyl methacrylate, octyl methacrylate, decyl methacrylate, n-lauryl methacrylate, 2-ethylhexyl methacrylate and the like. Of these, n-butyl acrylate can be given as a preferred one.

The crosslinking agent (II) used includes (meth)acrylates having two or more polymerizable unsaturated bonds. Specific examples thereof include ethylene glycol dimethacrylate, propylene glycol dimethacrylate, 1,3-butylene glycol dimethacrylate, 1,4-butylene glycol dimethacrylate and the like.

The graft-linking agent (II) is polymerized, at the time of polymerization for production of the polyalkyl (meth)acrylate rubber, together with other components to be incorporated into the rubber. However, at least a part of the polymerizable unsaturated groups of the agent (II) remains unreacted at that time, and at the time of the subsequent graft polymerization, the remaining unsaturated group is polymerized together with the graft branch component. In other words, the graft-linking agent (II) is a monomer having two or more polymerizable unsaturated bonds different in reactivity. Specific examples thereof include allyl methacrylate, triallyl cyanurate, triallyl isocyanurate and the like. Allyl methacrylate has functions of both the crosslinking agent (II) and graft-linking agent (II) as described below. That is, at the time of preparation of the polyalkyl (meth)acrylate rubber, a part of allyl methacrylate reacts at both the unsaturated groups to form a crosslinked structure, and the remainder reacts at only one of the unsaturated groups, the other unsaturated bond remaining free even after formation of the polyalkyl (meth)acrylate rubber and reacting to form a graft bond at the time of the subsequent graft polymerization.

Each of these crosslinking agent (II) and graft-linking agent (II) may be a simple compound or a mixture of two or more simple compounds. The amount of any one of these crosslinking agent (II) and graft-linking agent (II) used is 0.1 to 10 wt.% of the polyalkyl (meth)acrylate rubber component. When allyl methacrylate is used as both the crosslinking agent (II) and the graft-linking agent (II), it will suffice to use it in an amount of 0.2 to 20 wt.%.

For forming the polyalkyl (meth)acrylate rubber component, it will suffice to add the above alkyl (meth)acrylate, cross-linking agent (II) and graft-linking agent (II) to the polyorganosiloxane rubber latex previously neutralized by adding the aqueous solution of an alkali (e.g. sodium hydroxide, potassium hydroxide, sodium carbonate), thereby impregnating the polyorganosiloxane rubber particles with these components, and then polymerize these components by the action of a conventional radical polymerization initiator. With the progress of the polymerization, the cross-linked network of the polyalkyl (meth)acrylate rubber entangled with that of the polyorganosiloxane rubber is formed to obtain the latex of a compound rubber comprising the polyorganosiloxane rubber component and polyalkyl (meth)acrylate rubber component which are substantially inseparable from each other. It is preferred for this compound rubber to have a gel content of 80% or more when the rubber is extracted with toluene at 90° C. for 4 hours.

A preferred compound rubber is one in which the main skeleton of the polyorganosiloxane rubber component has a repeating unit derived from dimethylsiloxane, and the main skeleton of the polyalkyl (meth)acrylate rubber component has a repeating unit derived from n-butyl acrylate.

The proportion of each of the polyorganosiloxane rubber component and polyalkyl (meth)acrylate rubber component in the compound rubber is preferably 1 wt.% or more for the former and 99 wt.% or less for the latter. More preferably, the proportion is 5 wt.% or more for the former and 95 wt.% or less for the latter. When the proportion of the polyorganosiloxane rubber component is less than 1 wt.%, development of impact resistance becomes insufficient.

By graft-polymerizing a vinyl monomer onto the polyorganosiloxane rubber or compound rubber thus obtained, the polyorganosiloxane graft copolymer used in the present invention can be obtained.

The vinyl monomer used in the graft polymerization includes various vinyl monomers such as aromatic alkenyl compounds (e.g. styrene, α-methylstyrene, vinyltoluene), methacrylates (e.g. methyl methacrylate, 2-ethylhexyl methacrylate), acrylates (e.g. methyl acrylate, ethyl acrylate, butyl acrylate), vinyl cyanide compounds (e.g. acrylonitrile, methacrylonitrile) and the like. These vinyl monomers are used alone or in mixture of two or more of them. Of these vinyl monomers, (meth)acrylates are preferred, among which methyl methacrylate is particularly preferably used.

The content of the above vinyl monomer in the polyorganosiloxane graft copolymer is preferably 1 to 60 wt.%, more preferably 5 to 40 wt.% based on the weight of this graft copolymer. When the content of the vinyl monomer is less than 1 wt.%, interaction between the graft copolymer and polyamide resins which are a matrix resin is so weak that development of impact resistance becomes insufficient. When the content exceeds 60 wt.%, the content of the rubber decreases so that an effect to give impact resistance tends to lower.

The polyorganosiloxane graft copolymer used in the present invention can be separated and recovered as follows from the polyorganosiloxane graft copolymer latex obtained by adding the above vinyl monomer to the latex of the polyorganosiloxane rubber or the compound rubber and polymerizing the vinyl monomer by the one-stage or multi-stage radical polymerization technique. That is, the polyorganosiloxane graft copolymer latex is added to hot water in which a metal salt (e.g. calcium chloride, magnesium sulfate) has been dissolved, to salt-out and coagulate the graft copolymer.

When the average particle size of the graft copolymer used in the present invention is less than 0.08μ, the impact resistance of the resulting thermoplastic resin composition tends to become insufficient. The same applies to a case wherein the average particle size is larger than 0.6μ, the impact resistance tending to become insufficient, and at the same time molded products obtained from the above resin composition tends to become poor in surface appearance. Consequently, it is preferred for the average particle size to be in the range of 0.08 to 0.6μ. In order to obtain the graft copolymer having such an average particle size, it is preferred to use the polyorganosiloxane rubber or compound rubber produced by emulsion polymerization.

The organic silane compound having an epoxy group which can be used in the present invention includes a mixture of one or more compounds represented by the formula (3),

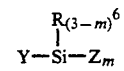

wherein m represents an integer of 1 to 3, $R^6$ represents a methyl or ethyl group, and Y and Z represent groups selected from the following respective groups,

Y:

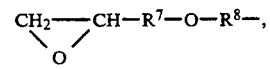

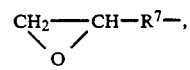

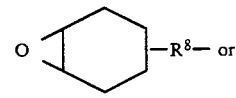

-continued

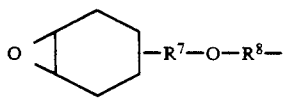

Z: 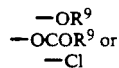
—OR⁹
—OCOR⁹ or
—Cl (in which $R^7$ represents an alkylene group having 1 to 3 carbon atoms, $R^8$ represents a single bond or an alkylene group having 1 to 3 carbon atoms, and $R^9$ represents a methyl or ethyl group).

Among the above organic silane compounds having an epoxy group, glycidoxyalkyltrialkoxysilanes, glycidoxyalkylalkyldialkoxysilanes, 3,4-epoxycyclohexylalkyltrialkoxysilanes and the like can be given as preferred ones. Specific examples of these compounds include γ-glycidoxypropyltrimethoxysilane, γ-glycidoxypropylmethyldiethoxysilane, β-(3,4-epoxycyclohexylethyl)trimethoxysilane and the like.

The thermoplastic resin composition of the present invention comprises (A) 60 to 99 parts by weight of at least one thermoplastic resin selected from the group consisting of polyamide resins, polymethacrylimide resins and polyetherimide resins, (B) 1 to 40 parts by weight of a polyorganosiloxane graft copolymer, the total weight of both the components (A) and (B) being 100 parts by weight, and (C) 0.01 to 10 parts by weight of a silane compound having an epoxy group. When the amount of the component (B) is less than 1 part by weight, development of impact strength becomes insufficient, and when it exceeds 40 parts by weight, the heat resistance of the composition lowers. Such the amounts are not therefore preferred. Further, when the amount of the component (C) blended is less than 0.01 part by weight based on 100 parts by weight of the total amount of the components (A) and (B), development of impact strength becomes insufficient, and when it exceeds 10 parts by weight, the flowability lowers. Such the amounts are not therefore preferred.

As far as the composition of the present invention contains the above resin components in the above blending ratio, a filler may further be incorporated into the composition, if necessary. Fillers having various forms such as a fibrous form, granular form, powdery form, etc. may be used as the filler of the present invention. Such the filler includes glass fibers, carbon fibers, potassium titanate, asbestos, silicon carbide, ceramics fibers, metal fibers, silicon nitride, aramide fibers, barium sulfate, calcium sulfate, calcium silicate, calcium carbonate, magnesium carbonate, antimony trioxide, zinc oxide, titanium oxide, magnesium oxide, iron oxide, molybdenum disulfide, mica, talc, kaolin, pyrophyllite, bentonite, sericite, zeolite, wollastonite, ferrite, graphite, gypsum, glass beads, glass balloons, quartz and the like.

When the filler is blended, its amount shall be 10 to 300 wt.% based on the total amount of the components (A), (B) and (C). When the amount is less than 10 wt.%, an effect to improve the heat resistance and mechanical strength owing to blending of the filler is small, and when it exceeds 300 wt.%, the melt-flowability of the composition lowers. Such the amounts are not preferred.

If the composition of the present invention is obtained by melt-mixing at least one thermoplastic resin selected from the group consisting of polyamide resins, polymethacrylimide resins and polyetherimide resins, the polyorganosiloxane graft copolymer and the silane compound having an epoxy group, any melt-mixing means may be used. Preferably, however, the polyorganosiloxane graft copolymer, at least one thermoplastic resin selected from the group consisting of polyamide resins, polymethacrylimide resins and polyetherimide resins, the organic silane compound having an epoxy group and if necessary the filler, all of these components being in a dried condition, are melt-kneaded and pelletized through an extruder.

The present invention will be illustrated specifically with reference to the following examples. In the examples, "part" means "part by weight". The physical properties in the referential examples, examples and comparative examples were measured by the following methods under an absolutely dried condition.

Average particle size

Measured according to the quasi-elastic light scattering method (MALVERN SYSTEM 4600; measurement temperature, 25° C.; angle of scattering, 90 degrees) using an aqueous dilute solution of the latex as sample solution.

Izod impact strength

Measured according to the method described in ASTM D-256 using a notched test piece of ⅛" in thickness.

Heat distortion temperature

Measured according to the method described in ASTM D-256 (load, 18.6 kg/cm²).

Surface appearance of molded products

Examined by visual assessment of the surface of injection-molded products according to the following standard:
∘Good,
×Inferior,
ΔSlightly inferior Adhesion property of paint film A flat plate was prepared by molding, and its surface was coated with an acrylic urethane paint (reaction product of toluenediisocyanate with acrylic polyol). After drying, 11 parallel grooves were cut into the coated surface at intervals of 1 mm in one direction, and the same procedure was repeated in the direction perpendicular thereto, thereby forming 100 grid patterns of 1 mm². An adhesive cellulose tape was applied over the cross-hatched area and peeled off the area in the vertical direction to the surface of the flat plate, and the number of the paint films peeled off the area was counted. The adhesion property of the paint film was evaluated according to the following standard:
⊙when the number of peeled paint films is 10 or less;
∘when the number is 11 to 20;
Δwhen the number is 21 to 40; and
×when the number is 41 or more.

The organic silane compounds in the tables are as follows:
(a) : γ-Glycidoxypropyltrimethoxysilane (KBM 403 produced by Shin-Etsu Chemical Industry Co., Ltd.).

(b) : γ-Glycidoxypropyltrimethyldiethoxysilane (KBE 402 produced by Shin-Etsu Chemical Industry co., Ltd.).

(c) : β-(3,4-Epoxycyclohexyl)ethyltrimethoxysilane (KBM 303 produced by Shin-Etsu Chemical Industry Co., Ltd.).

(d) : γ-Mercaptopropyltrimethoxysilane (KBM 803 produced by Shin-Etsu Chemical Industry Co., Ltd.).

(e) : γ-Aminopropyltriethoxysilane (KBE 903 produced by Shin-Etsu Chemical Industry Co., Ltd.).

In the tables, symbols 66, 6 and 46 in the item of polyamide mean nylon 6.6, nylon 6 and nylon 4.6, respectively, and GF and CF mean glass fiber and carbon fiber, respectively.

REFERENTIAL EXAMPLE 1

Production of polyorganosiloxane graft copolymer (S-1)

Two parts of tetraethoxysilane, 0.5 part of γ-methacryloyloxypropyldimethoxymethylsilane and 97.5 parts of octamethylcyclotetrasiloxane were mixed to obtain 100 parts of a siloxane mixture. One part of sodium dodecylbenzenesulfonate and 1 part of dodecylbenzenesulfonic acid were dissolved in 200 parts of distilled water, and the resulting solution was added to 100 parts of the above siloxane mixture. The resulting mixture was preliminarily stirred at 10,000 rpm with a homomixer and then emulsified with a homogenizer under a pressure of 300 kg/cm$^2$ to obtain an organosiloxane latex. This latex was transferred to a separable flask equipped with a condenser and a stirring blade, and heated at 80° C. for 5 hours with stirring and mixing and then allowed to stand at 20° C. for 48 hours. Thereafter, this latex was neutralized to a pH of 7.0 with an aqueous sodium hydroxide solution to obtain a polyorganosiloxane rubber latex (hereinafter referred to as PDMS-1). The conversion of the siloxane mixture to the polyorganosiloxane rubber was 89.7%, and the number average particle size of the polyorganosiloxane rubber was 0.16 μm.

Thirty-three parts of this PDMS-1 was sampled and put in a separable flask equipped with a stirrer. After 267 parts of distilled water was added and the atmosphere of the flask was replaced by nitrogen, the contents of the flask were heated to 50° C. At this temperature, a mixed solution of 80 parts of n-butyl acrylate, 1.6 parts of allyl methacrylate and 0.192 part of tert-butyl hydroperoxide was added, after which stirring was continued for 30 minutes to allow this mixed solution to soak into the polyorganosiloxane rubber particles. Thereafter, a mixed solution of 0.001 part of ferrous sulfate, 0.003 part of disodium ethylenediaminetetraacetate, 0.24 part of Rongalite and 10 parts of distilled water was added to start radical polymerization. The reaction mixture was kept at an inner temperature of 70° C. for 2 hours to obtain a compound rubber latex. A part of this latex was sampled and dried to obtain a solid matter. This solid matter was extracted with toluene at 90° C. for 4 hours, and the gel content was measured to find that it was 95.3 wt.%.

To this compound rubber latex was added a mixed solution of 10 part of methyl methacrylate and 0.024 part of tert-butyl hydroperoxide. The resulting mixture was kept at an inner temperature of 70° C. for 4 hours to carry out graft polymerization onto the compound rubber. The conversion of methyl methacrylate was 97.5%. The average particle size of the graft copolymer latex obtained was 0.20 μm. The resulting graft copolymer latex was added dropwise to 600 parts of hot water containing 1.5 wt.% of calcium chloride to coagulate the latex. The coagulated product was separated, washed repeatedly with water and dried at 80° C. for 24 hours to obtain 97.7 parts of the dry powder of a polyorganosiloxane graft copolymer (S-1).

REFERENTIAL EXAMPLES 2 to 8

Production of polyorganosiloxane graft copolymers (S-2 to S-8)

A polyorganosiloxane graft copolymer was obtained in the same manner as in Referential Example 1 except that the amounts of PDMS-1, distilled water, n-butyl acrylate and allyl methacrylate, which were used for preparation of a compound rubber, were as described in Table 1, and that the amount of methyl methacrylate used in graft polymerization was as described in Table 1. The conversion of methyl methacrylate and the average particle size and yield of the graft copolymer are shown in Table 1.

TABLE 1

| Referential Example | 2 | 3 | 4 | 5 | 6 | 7 | 8 |
|---|---|---|---|---|---|---|---|
| Polyorganosiloxane graft copolymer | S-2 | S-3 | S-4 | S-5 | S-6 | S-7 | S-8 |
| PDMS-1 (part) | 100 | 150 | 200 | 267 | 133 | 117 | 300 |
| Distilled water (part) | 220 | 185 | 150 | 103 | 197 | 208 | 20 |
| n-Butyl acrylate (part) | 60 | 45 | 30 | 10 | 40 | 35 | — |
| Allyl methacrylate (part) | 1.2 | 0.9 | 0.6 | 0.2 | 0.8 | 0.7 | — |
| Methyl methacrylate (part) | 10 | 10 | 10 | 10 | 20 | 30 | 10 |
| Conversion of methyl methacrylate (%) | 97.8 | 98.3 | 97.1 | 96.9 | 98.0 | 98.1 | 94.3 |
| Gel content of compound rubber (wt. %) | 98 | 98 | 96 | 92 | 98 | 98 | 92 |
| Average particle size of graft copolymer latex (μm) | 0.20 | 0.19 | 0.18 | 0.18 | 0.19 | 0.19 | 0.18 |
| Yield of graft copolymer (part) | 96.3 | 97.4 | 96.9 | 97.1 | 96.5 | 97.2 | 95.3 |

REFERENTIAL EXAMPLE 9

Production of polyorganosiloxane graft copolymer (S-9)

A polyorganosiloxane graft copolymer S-9 was obtained in the same manner as in Referential Example 1 except that the siloxane mixture was a mixture of 2 parts of tetraethoxysilane and 98 parts of octamethylcyclotetrasiloxane. The gel content of the compound rubber was 97 wt.%, the conversion of methyl methacrylate was 98.1%, and the average particle size of the graft copolymer was 0.21 μm.

REFERENTIAL EXAMPLE 10

Production of polyorganosiloxane graft copolymer (S-10):

A polyorganosiloxane graft copolymer S-10 was obtained in the same manner as in Referential Example 1 except that 2-ethylhexyl acrylate was used in place of n-butyl acrylate in an amount equal to that of n-butyl acrylate. The gel content of the compound rubber was 98 wt.%, the conversion of methyl methacrylate was 97.2%, and the average particle size of the graft copolymer was 0.21 μm.

REFERENTIAL EXAMPLE 11

Production of polyorganosiloxane graft copolymer (S-11)

A polyorganosiloxane graft copolymer S-11 was obtained in the same manner as in Referential Example 1 except that styrene was used in place of methyl methacrylate in an amount equal to that of methyl methacrylate. The gel content of the compound rubber was 98 wt.%, the conversion of methyl methacrylate was 97.6%, and the average particle size of the graft copolymer was 0.20 μm.

REFERENTIAL EXAMPLE 12

Production of polymethacrylimide resin:

One hundred parts of polymethyl methacrylate, 100 parts of toluene and 10 parts of methanol, all of which were thoroughly dried in advance, and a primary amine or ammonia shown in Table 2, its amount being shown in Table 2, were fed to an autoclave and reacted at 230° C. for 2 hours with stirring. The reaction product thus obtained was extruded and pelletized through a vent-type extruder at a resin temperature of 260° C. while removing a volatile gas from the vent (A-1 to A-4). Further, a polymethacrylimide resin (A-5) was obtained in the same manner as in A-1 except that a 1:1 random copolymer of methyl methacrylate and ethyl methacrylate was used in place of polymethyl methacrylate. The performance of these polymethacrylimide resins obtained are shown in Table 2.

TABLE 2

| Kind of poly-methacrylimide resin | Imidating agent Kind | Amount (part) | Imide ring content (wt. %) | Heat distortion temperature (°C.) |
|---|---|---|---|---|
| A-1 | Methylamine | 20 | 85 | 142 |
| A-2 | Methylamine | 30 | 97 | 169 |
| A-3 | Ammonia | 20 | 75 | 156 |
| A-4 | Ethylamine | 30 | 96 | 155 |
| A-5 | Methylamine | 25 | 85 | 142 |

EXAMPLES 1 to 20 and COMPARATIVE EXAMPLES 1 to 7

Using as the polyamide resin nylon 6 (UBE 6 NYLON 1013NW8 produced by Ube Industries, Ltd.), nylon 6.6 (UBE 66 NYLON 2020B produced by Ube Industries, Ltd.) and nylon 4.6 (UNITIKA NYLON 46 F5000 produced by Unitika, Ltd.), these resins and the polyorganosiloxane graft copolymers S-1 to S-11 obtained in Referential Examples were blended with organic silane compounds in proportions shown in Table 3. Every mixture was melt-kneaded and pelletized with a twin-screw extruder (TEM-35B produced by Toshiba Machine Co., Ltd.) at a cylinder temperature of 260° to 290° C. The pellet obtained was dried and then molded into test pieces with an injection molding machine (Promat injection molding machine produced by Sumitomo Heavy Industries, Ltd.) at a cylinder temperature of 260° to 290° C. and at a mold temperature of 70° C. The impact resistance was then evaluated with the test pieces. For comparison, evaluation was also carried out on the following cases : Cases wherein the polyamides alone were used; cases wherein the graft copolymers or silane compounds having an epoxy group were not blended; and cases wherein organic silane compounds having other functional group were used in place of the silane compounds having an epoxy group. These results are shown in Table 3.

TABLE 3

| | Polyamide (part) | Graft copolymer (part) | | Organic silane compound (part) | | Izod impact strength (kg.cm/cm) 23° C. | −30° C. | Appearance | Adhesion property of paint film |
|---|---|---|---|---|---|---|---|---|---|
| Example | | | | | | | | | |
| 1 | 66 | 80 | S-1 | 20 | (a) 1 | 111 | 80 | ○ | ⊚ |
| 2 | 66 | 80 | S-2 | 20 | (a) 1 | 105 | 86 | ○ | ⊚ |
| 3 | 66 | 80 | S-3 | 20 | (a) 1 | 107 | 90 | ○ | ⊚ |
| 4 | 66 | 80 | S-4 | 20 | (a) 1 | 110 | 89 | ○ | ⊚ |
| 5 | 66 | 80 | S-5 | 20 | (a) 1 | 102 | 92 | ○ | ⊚ |
| 6 | 66 | 80 | S-6 | 20 | (a) 1 | 89 | 77 | ○ | ⊚ |
| 7 | 66 | 80 | S-7 | 20 | (a) 1 | 86 | 72 | ○ | ⊚ |
| 8 | 66 | 80 | S-8 | 20 | (a) 1 | 109 | 82 | ○ | △ |
| 9 | 66 | 80 | S-9 | 20 | (a) 1 | 107 | 81 | ○ | ⊚ |
| 10 | 66 | 80 | S-10 | 20 | (a) 1 | 110 | 80 | ○ | ⊚ |
| 11 | 66 | 80 | S-11 | 20 | (a) 1 | 110 | 78 | ○ | ⊚ |
| 12 | 66 | 85 | S-1 | 15 | (a) 1 | 55 | 45 | ○ | ⊚ |
| 13 | 66 | 70 | S-1 | 30 | (a) 1 | 122 | 103 | ○ | ⊚ |
| 14 | 66 | 80 | S-1 | 20 | (a) 0.5 | 105 | 81 | ○ | ⊚ |
| 15 | 66 | 80 | S-1 | 20 | (a) 2 | 109 | 84 | ○ | ⊚ |
| 16 | 66 | 80 | S-1 | 20 | (a) 5 | 108 | 83 | ○ | ⊚ |
| 17 | 66 | 80 | S-1 | 20 | (b) 1 | 105 | 83 | ○ | ⊚ |
| 18 | 66 | 80 | S-1 | 20 | (c) 1 | 101 | 79 | ○ | ⊚ |
| 19 | 6 | 80 | S-1 | 20 | (a) 1 | 106 | 85 | ○ | ⊚ |
| 20 | 46 | 80 | S-1 | 20 | (a) 1 | 110 | 87 | ○ | ⊚ |
| Comparative Example | | | | | | | | | |
| 1 | 66 | 100 | | | | 4 | 3 | ○ | ⊚ |
| 2 | 66 | 80 | S-1 | 20 | | 27 | 22 | △ | x |
| 3 | 66 | 100 | | | (a) 1 | 3 | 3 | ○ | ⊚ |
| 4 | 66 | 80 | S-1 | 20 | (d) 1 | 33 | 26 | △ | x |
| 5 | 66 | 80 | S-1 | 20 | (e) 1 | 34 | 26 | △ | x |

TABLE 3-continued

| | Polyamide (part) | Graft copolymer (part) | Organic silane compound (part) | Izod impact strength (kg.cm/cm) 23° C. | Izod impact strength (kg.cm/cm) −30° C. | Appearance | Adhesion property of paint film |
|---|---|---|---|---|---|---|---|
| 6 | 6 | 6 | 100 | 5 | 3 | ○ | ⊚ |
| 7 | 46 | 100 | | 5 | 4 | ○ | ⊚ |

EXAMPLES 21 to 28 and COMPARATIVE EXAMPLES 8 to 13

Test pieces were prepared by injection molding and evaluation was carried out in the same manner as in Example 1 except that a glass fiber (GF), a carbon fiber (CF) and talc (TA) were used as a filler in blending ratios shown in Table 4. The results are shown in Table 4.

EXAMPLES 29 to 47 and COMPARATIVE EXAMPLES 14 to 17

The polymethacrylimide resins A-1 to A-5 obtained in Referential Example 12, the polyorganosiloxane graft copolymers S-1 to S-10 obtained in Referential Examples and the organic silane compounds shown in Table 5 were blended in proportions shown in Table 5. Every mixture was melt-kneaded and pelletized with a twin-screw extruder (TEM-35B produced by Toshiba Machine Co., Ltd.) at a cylinder temperature of 280° C. The pellet obtained was dried and then molded into test pieces with an injection molding machine (Promat injection molding machine produced by Sumitomo Heavy Industries, Ltd.) at a cylinder temperature of 280° C. and at a mold temperature of 60° C. Evaluation was then carried out with the test pieces. The results are shown in Table 5.

TABLE 4

| | Polyamide (part) | Graft copolymer (part) | Organic silane compound (part) | Filler (part) | Izod impact strength (kg.cm/cm) 23° C. | Izod impact strength (kg.cm/cm) −30° C. |
|---|---|---|---|---|---|---|
| Example 21 | 66 | 80 | S-1 20 | (a) 1 | GF 43 | 33 | 27 |
| Example 22 | 66 | 80 | S-1 20 | (a) 1 | GF 25 | 28 | 25 |
| Exampel 23 | 66 | 80 | S-1 20 | (a) 1 | GF 67 | 31 | 27 |
| Example 24 | 66 | 80 | S-1 20 | (a) 1 | CF 43 | 26 | 21 |
| Example 25 | 66 | 80 | S-1 20 | (a) 1 | TA 43 | 20 | 17 |
| Example 26 | 66 | 80 | S-1 20 | (b) 1 | GF 43 | 31 | 27 |
| Example 27 | 66 | 80 | S-1 20 | (c) 1 | GF 43 | 32 | 26 |
| Example 28 | 6 | 80 | S-1 20 | (a) 1 | GF 43 | 35 | 29 |
| Comparative Example 8 | 66 | 100 | | | GF 43 | 8 | 6 |
| Comparative Example 9 | 66 | 80 | S-1 20 | | GF 43 | 13 | 11 |
| Comparative Example 10 | 66 | 100 | | (a) 1 | GF 43 | 8 | 7 |
| Comparative Example 11 | 66 | 100 | | | CF 43 | 9 | 7 |
| Comparative Example 12 | 66 | 100 | | | TA 43 | 6 | 4 |
| Comparative Example 13 | 6 | 100 | | | GF 43 | 9 | 7 |

TABLE 5

| | Polymethacrylimide resin (part) | Graft copolymer (part) | Organic silane compound (part) | Izod impact strength (kg.cm/cm) | HDT (°C.) | Appearance | Strength of paint film |
|---|---|---|---|---|---|---|---|
| Example | | | | | | | |
| 29 | A-1 80 | S-1 20 | (a) 1 | 18 | 139 | ○ | ⊚ |
| 30 | A-1 80 | S-2 20 | (a) 1 | 20 | 140 | ○ | ⊚ |
| 31 | A-1 80 | S-3 20 | (a) 1 | 18 | 141 | ○ | ⊚ |
| 32 | A-1 80 | S-4 20 | (a) 1 | 19 | 140 | ○ | ⊚ |
| 33 | A-1 80 | S-5 20 | (a) 1 | 19 | 140 | ○ | ⊚ |
| 34 | A-1 80 | S-6 20 | (a) 1 | 17 | 140 | ○ | ⊚ |
| 35 | A-1 80 | S-7 20 | (a) 1 | 14 | 140 | ○ | ⊚ |
| 36 | A-1 80 | S-8 20 | (a) 1 | 19 | 140 | ○ | △ |
| 37 | A-1 80 | S-9 20 | (a) 1 | 18 | 139 | ○ | ⊚ |
| 38 | A-1 80 | S-10 20 | (a) 1 | 17 | 139 | ○ | ⊚ |
| 39 | A-1 80 | S-11 20 | (a) 1 | 18 | 139 | ○ | ⊚ |
| 40 | A-2 80 | S-1 20 | (a) 1 | 13 | 161 | ○ | ⊚ |
| 41 | A-3 80 | S-1 20 | (a) 1 | 14 | 153 | ○ | ⊚ |
| 42 | A-4 80 | S-1 20 | (a) 1 | 18 | 139 | ○ | ⊚ |
| 43 | A-5 80 | S-1 20 | (a) 1 | 16 | 140 | ○ | ⊚ |
| 44 | A-1 80 | S-1 20 | (b) 1 | 17 | 139 | ○ | ⊚ |
| 45 | A-1 80 | S-1 20 | (c) 1 | 18 | 140 | ○ | ⊚ |
| 46 | A-1 85 | S-1 15 | (a) 1 | 16 | 139 | ○ | ⊚ |
| 47 | A-1 70 | S-1 30 | (a) 1 | 18 | 138 | ○ | ⊚ |
| Comparative Example | | | | | | | |
| 14 | A-1 100 | | | 2 | 144 | ○ | ⊚ |

TABLE 5-continued

|    | Polymeth-acrylimide resin (part) | | Graft copolymer (part) | | Organic silane compound (part) | Izod impact strength (kg.cm/cm) | HDT (°C.) | Appearance | Strength of paint film |
| --- | --- | --- | --- | --- | --- | --- | --- | --- | --- |
| 15 | A-3 | 100 | | | | 2 | 157 | ○ | ⊚ |
| 16 | A-1 | 80 | S-1 | 20 | | 11 | 138 | △ | x |
| 17 | A-1 | 100 | | | (a) 1 | 2 | 142 | ○ | ⊚ |

EXAMPLES 48 and COMPARATIVE EXAMPLE 18

Seventy parts of the polymethacrylimide resin composition obtained in Example 29 and 30 parts of a glass fiber were blended, and melt-kneaded and pelletized with a twin-screw extruder (TEM-35B produced by Toshiba Machine Co., Ltd.) at a cylinder temperature of 280° C. For comparison, 70 parts of the polymethacrylimide resin A-1 and 30 parts of a glass fiber were blended and pelletized in the same manner as above. The pellet obtained was dried, and molding into test pieces and evaluation were carried out in the same manner as in Example 29.

As a result, the blend of the polymethacrylimide resin composition and a glass fiber (Example 48) had an Izod impact strength of 17 kg·cm/cm and a heat distortion temperature of 141° C. While the blend of the polymethacrylimide resin and a glass fiber (Comparative Example 18) had an Izod impact strength of 8 kg·cm/cm and a heat distortion temperature of 144° C.

EXAMPLES 49 to 63 and COMPARATIVE EXAMPLES 19 to 23

A polyetherimide resin (Ultem #1000 produced by General Electric Co., Ltd.), the polyorganosiloxane graft copolymers S-1 to S-11 obtained in Referential Examples and the organic silane compounds shown in Table 6 were blended in proportions shown in Table 6. Every mixture was melt-kneaded and pelletized with a twin-screw extruder (TEM-35B produced by Toshiba Machine Co., Ltd.) at a cylinder temperature of 350° C. The pellet obtained was dried and then molded into test pieces with an injection molding machine (Promat injection molding machine produced by Sumitomo Heavy Industries, Ltd.) at a cylinder temperature of 350° C. and at a mold temperature of 80° C. The impact resistance was then evaluated with the test pieces. The results are shown in Table 6.

TABLE 6

|  | Polyetherimide resin (part) | Graft copolymer (part) | | Organic silane compound (part) | Izod impact strength (kg.cm/cm) | HDT (°C.) | Appearance | Adhesion strength of paint film |
| --- | --- | --- | --- | --- | --- | --- | --- | --- |
| Example | | | | | | | | |
| 49 | 80 | S-1 | 20 | (a) 1 | 119 | 190 | ○ | ⊚ |
| 50 | 80 | S-2 | 20 | (a) 1 | 118 | 189 | ○ | ⊚ |
| 51 | 80 | S-3 | 20 | (a) 1 | 119 | 191 | ○ | ⊚ |
| 52 | 80 | S-4 | 20 | (a) 1 | 110 | 190 | ○ | ⊚ |
| 53 | 80 | S-5 | 20 | (a) 1 | 112 | 190 | ○ | ⊚ |
| 54 | 80 | S-6 | 20 | (a) 1 | 104 | 188 | ○ | ⊚ |
| 55 | 80 | S-7 | 20 | (a) 1 | 99 | 187 | ○ | ⊚ |
| 56 | 80 | S-8 | 20 | (a) 1 | 117 | 189 | ○ | △ |
| 57 | 80 | S-9 | 20 | (a) 1 | 118 | 189 | ○ | ⊚ |
| 58 | 80 | S-10 | 20 | (a) 1 | 111 | 189 | ○ | ⊚ |
| 59 | 80 | S-11 | .20 | (a) 1 | 117 | 191 | ○ | ⊚ |
| 60 | 80 | S-1 | 20 | (b) 1 | 117 | 189 | ○ | ⊚ |
| 61 | 80 | S-1 | 20 | (c) 1 | 118 | 192 | ○ | ⊚ |
| 62 | 90 | S-1 | 10 | (a) 1 | 34 | 195 | ○ | ⊚ |
| 63 | 70 | S-1 | 30 | (a) 1 | 119 | 182 | ○ | ⊚ |
| Comparative Example | | | | | | | | |
| 19 | 100 | | | | 5 | 202 | ○ | ⊚ |
| 20 | 80 | S-1 | 20 | | 23 | 190 | △ | x |
| 21 | 100 | | | (a) 1 | 5 | 201 | ○ | ⊚ |
| 22 | 80 | S-1 | 20 | (d) 1 | 24 | 190 | △ | x |
| 23 | 80 | S-1 | 20 | (e) 1 | 22 | 189 | △ | x |

EXAMPLE 64 and COMPARATIVE EXAMPLE 24

Seventy parts of the polyetherimide resin composition obtained in Example 49 and 30 parts of a glass fiber were blended, and melt-kneaded and pelletized with a twin-screw extruder (TEM-35B produced by Toshiba Machine Co., Ltd.) at a cylinder temperature of 350° C. For comparison, 70 parts of the polyetherimide resin and parts of a glass fiber were blended and pelletized in the same manner as above. The pellet obtained was dried, and molding into test pieces and evaluation were carried out in the same manner as in Example 49.

As a result, the blend of the polyetherimide resin composition and a glass fiber (Example 64) had an Izod impact strength of 29 kg·cm/cm and a heat distortion temperature of 191° C. While the blend of the polyetherimide resin and a glass fiber (Comparative Example 24) had an Izod impact strength of 11 kg·cm/cm and a heat distortion temperature of 201° C.

INDUSTRIAL APPLICABILITY

As described above, the thermoplastic resin composition of the present invention is excellent in impact resistance, heat resistance, surface appearance and the like, and can be used under severer conditions than before so that it has a characteristic that development of a wider range of use becomes possible.

We claim:

1. A thermoplastic resin composition comprising (A) 60 to 99 parts by weight of at least one thermoplastic resin selected from the group consisting of polyamide resins, polymethacrylimide resins and polyetherimide resins, (B) 1 to 40 parts by weight of polyorganosiloxane graft copolymer obtained by graft-polymerizing one or more kinds of vinyl monomer onto a polyorganosiloxane rubber or a polyorganosiloxane compound rubber having such a structure that the polyorganosiloxane rubber component and polyalkyl (meth)acrylate rubber component are entangled with each other so as to be inseparable from each other, the total amount of both the components (A) and (B) being 100 parts by weight, and (C) 0.01 to 10 parts by weight of an organic silane compound having an epoxy group.

2. A thermoplastic resin composition according to claim 1 which additionally contains a filler in an amount of 10 to 300 wt.% based on the total weight of the components (A), (B) and (C).

3. A thermoplastic resin composition according to claim 1 or 2, wherein the polyorganosiloxane graft copolymer has an average particle size of 0.08 to 0.6 μm.

4. A thermoplastic resin composition according to claim 1 or 2, wherein the vinyl monomer is a (meth)acrylate.

5. A thermoplastic resin composition according to claim 1 or 2, wherein the silane compound having an epoxy group is one or more members selected from the group consisting of γ-glycidoxypropyltrimethoxysilane, γ-glycidoxypropylmethyldiethoxysilane and and β-(3,4-epoxycyclohexy)ethyltrimethoxysilane.

6. A thermoplastic resin composition according to claim 2, wherein the filler is a glass fiber or a carbon fiber.

7. A thermoplastic resin composition according to claim 1 or 2, wherein the thermoplastic resin is a polyamide resin selected from the group consisting of nylon 6-6, nylon 6 and nylon 4-6.

* * * * *